United States Patent
House

[15] 3,702,535
[45] Nov. 14, 1972

[54] REARVIEW MIRROR

[72] Inventor: John I. House, 27201 Wellington Drive, Franklin, Mich. 48025

[22] Filed: Jan. 15, 1971

[21] Appl. No.: 106,688

[52] U.S. Cl. ................60/54.5 R, 60/54.6 R, 92/15, 188/67
[51] Int. Cl. ..........................F15b 7/00, F15b 15/26
[58] Field of Search ..............60/54.5; 188/67; 92/15

[56] References Cited

UNITED STATES PATENTS

| | | | |
|---|---|---|---|
| 3,475,911 | 11/1969 | Harrison | 60/54.5 |
| 2,924,943 | 2/1960 | Dickinson | 60/54.5 |
| 2,502,780 | 4/1950 | Dreffein | 188/67 |
| 2,819,406 | 1/1958 | Frecking, Jr. et al. | 188/67 |
| 3,013,392 | 12/1961 | Falge et al. | 60/54.5 |
| 2,787,235 | 4/1957 | Schroeder | 60/54.5 |
| 3,299,637 | 1/1967 | Ballard | 60/54.5 |

Primary Examiner—Martin P. Schwadron
Assistant Examiner—A. M. Zupcic
Attorney—Whittemore, Hulbert & Belknap

[57] ABSTRACT

A remote control actuating mechanism for adjusting the angular position of an outside vehicle rearview mirror. The mechanism comprises a master control device and a slave device, each having a piston reciprocable within a cylinder. Closed hydraulic circuits connect the two devices so that when the control piston is manually moved in one direction or the other, there is a corresponding movement of the slave piston. A rack and gear connection between the slave piston and the mirror causes the mirror to be angularly adjusted in response to movement of the slave piston.

4 Claims, 4 Drawing Figures

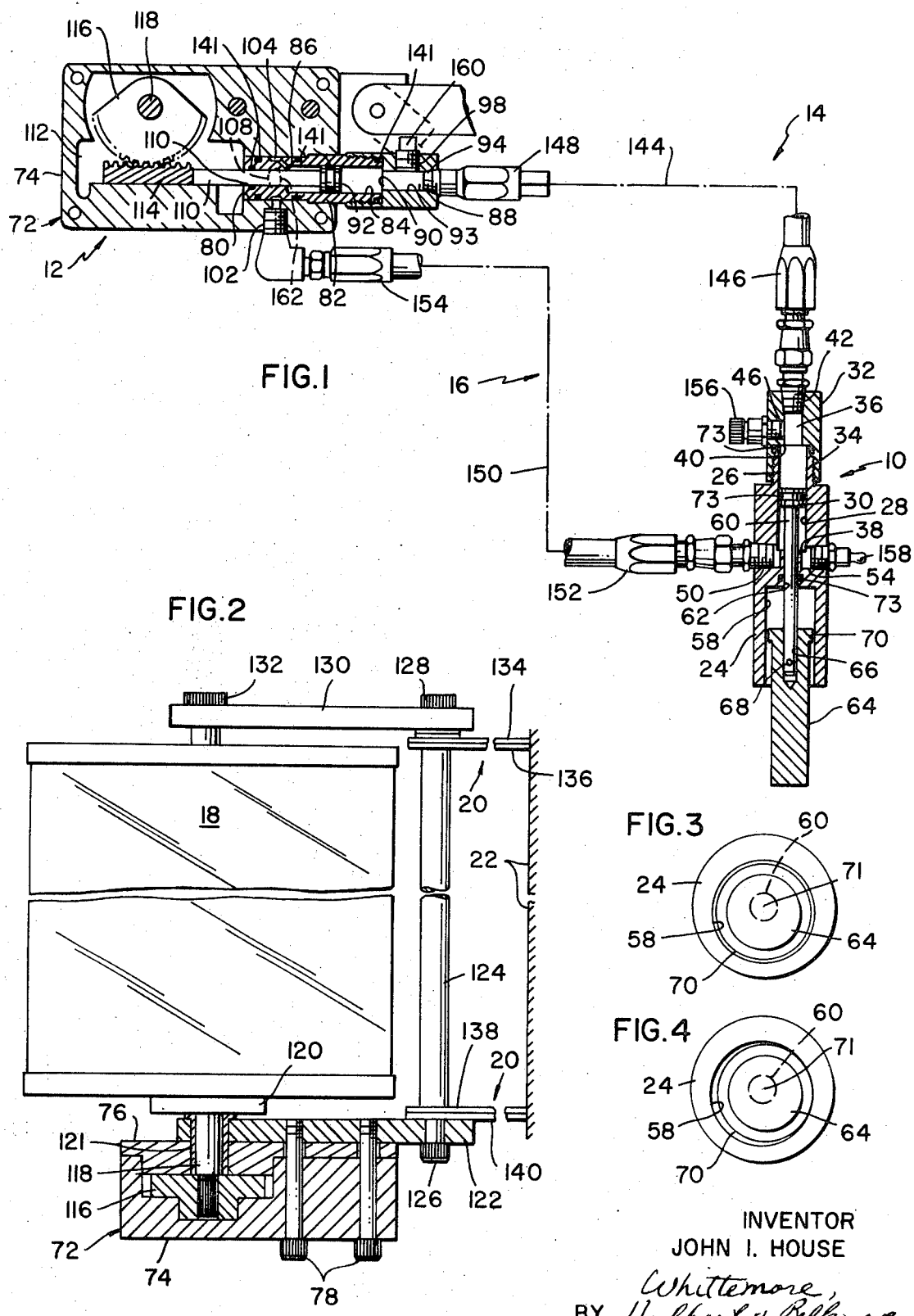

REARVIEW MIRROR

SUMMARY OF THE INVENTION

One object of this invention is to provide a remote control actuating mechanism for adjusting the angular position of an outside vehicle rearview mirror which utilizes closed hydraulic circuits to produce the angular adjustment of the mirror in both directions.

Another object is to provide a remote control actuating mechanism having a master control device and a slave device both of the piston and cylinder type and connected by closed hydraulic circuits so that manual movement of the control piston in either direction will produce a corresponding movement of the slave piston.

Another object is to provide a remote control actuating mechanism which is positive in operation through the utilization of closed hydraulic circuits.

Another object is to provide an actuating mechanism in which virtually all lost motion is eliminated.

Another object is to provide an actuating mechanism having improved means for locking the mechanism in any selected position within its range of adjustment.

Other objects and features of this invention will become apparent as this description proceeds, especially when taken in conjunction with the accompanying drawing, wherein:

FIG. 1 is a plan view of the actuating mechanism including the master control device, slave device and connecting hydraulic lines, showing these devices in section.

FIG. 2 is a view of the mirror shown in elevation mounted on the slave device shown in section, and also showing the means for mounting the slave device and mirror on the side or on the door of a vehicle.

FIG. 3 is an end view of the control device looking upwardly in FIG. 1.

FIG. 4 is similar to FIG. 3 but shows the parts in a locked position.

Referring now more particularly to the drawing, the remote control actuating mechanism includes a control device 10, a slave device 12, closed hydraulic circuits 14 and 16 connecting the two devices, a vertical rearview mirror 18 angularly adjustably mounted on the slave device, and a bracket assembly 20 for mounting the slave device and mirror outside the vehicle on the door or side 22 thereof. The remote control mechanism for the mirror is particularly designed for use in connection with trucks and buses.

The master control device 10 comprises an elongated tubular casing 24 having a reduced extension 26 at one end. A cylinder 28 of uniform circular cross section is provided in the casing extending from an intermediate point in its length through the end of the reduced extension 26. A piston 30 is rotatable and reciprocable within cylinder 28.

A tubular cap 32 is threaded on the extension 26 of casing 24 where indicated at 34. The cap 32 has a chamber 36 communicating with the cylinder 28. The annular wall 38 in the casing and the annular wall 40 in the cap define the ends of the cylinder 28 and also define the limits of movement of piston 30.

The cap 32 has a pressure port 42 communicating with chamber 36 at one side of piston 30 and also a filler port 46. The casing 24 has a pressure port 50 communicating with the cylinder 28 at the opposite side of the piston as well as a filler port 54.

The casing 24 has an elongated cylindrical socket or chamber 58 at the end opposite extension 26. The piston rod 60 extends from piston 30 through the passage 62 into socket 58. An elongated knurled knob or handle 64 has a socket 66 at one end receiving the end of the piston rod and secured thereto by pin 68. The handle extends beyond the end of the casing so that it may be operated by hand to move the piston 30 back and forth in cylinder 28.

The handle 64 has an enlarged circular locking portion 70 within socket 58. The locking portion 70 is of a slightly smaller diameter than the socket 58 and in one angular position thereof as viewed in FIG. 3 is concentric with and therefore free and clear of the socket wall. However, the axis 71 of piston rod 60 is eccentric or offset with respect to both the socket wall and the locking portion 70 so that upon angular or turning movement of the handle the locking portion will wedge or lock upon the chamber wall as seen in FIG. 4.

Suitable O-ring seals 73 are provided for the piston 30, between the casing extension 26 and cap 32, and in casing 26 around piston rod 60.

The slave device 12 comprises a casing 72 having a body portion 74 and a cover portion 76 which are preferably fastened together as by the bolts 78. The body 74 has an elongated cylindrical opening 80 in one end threadedly receiving an elongated tubular plug 82. The plug 82 has a cylinder 84 extending from the annular wall 86 within the plug to the outer end of the plug beyond the casing. A tubular cap 88 is threaded on the outer end of the plug and has an annular wall 90 defining the other end of cylinder 84. The piston 92 is reciprocable within cylinder 84 within the limits provided by walls 86 and 90. The piston 92 and cylinder 84 are the same diameter as piston 30 and cylinder 28 of the control device 10.

The cap 88 has a chamber 93 which communicates with one end of cylinder 84 and which has a pressure port 94. Chamber 93 also has a bleeder port 98. The body 74 of the slave device has a pressure port 102. This port 102 communicates with the opposite end of the cylinder 84 through passages 104 in the plug 82. There is also a bleeder port 108 communicating with the same end of the cylinder 84.

The piston 92 has a rod 110 which extends through a passage 111 in the plug into a chamber 112 in the body 74 where it is threadedly connected to a rack 114. The rack is in mesh with a gear segment 116 secured by a spline connection to a shaft 118, the upper end of which has a mounting 120 secured to the lower end of the mirror 18. The shaft 118 is journaled for rotation in the casing 72 by the bearing sleeve 121. The spline connection between the shaft 118 and gear segment 116 permits initial adjustment in the angle of the mirror depending on whether the mirror is mounted on the right or left side of the vehicle.

As seen in FIG. 2, the mounting 20 for the mirror assembly includes a plate 122 bolted to the slave device 12. A vertical shaft 124 runs alongside the mirror and is pivotally connected to the plate 122 by a bolt 126. The upper end of the shaft 124 is pivotally connected by a bolt 128 to an arm or plate 130 which is pivotally connected by fastener 132 to the upper end of the mirror. The bolts 126 and 128 apply sufficient tension to retain the angular adjustment of the plates 122 and 130 although permitting a manual change in the adjustment. Not only is the mirror thus adjustable angularly about shaft 124, but it is also adjustable angularly about the common axis of shaft 118 and fastener 132. Mounting arms 134–140 serve to mount the shaft 124 to the side or door of the vehicle.

Suitable O-ring seals 141 are provided for the piston 92 between plug 82 and cap 88, in plug 82 around piston rod 110 and between plug 82 and body 74.

The hydraulic circuit 14 connecting the two devices 10 and 12 includes a flexible conduit 144 having fittings 146 and 148 at the ends respectively threaded into the pressure ports 42 and 94 of the devices 10 and 12. The hydraulic circuit 16 includes a flexible conduit 150 having fittings 152 and 154 at the ends respectively threaded into the pressure ports 50 and 102 of the devices 10 and 12. The fittings communicate through the pressure ports with the cylinders 28 and 84 in the devices 10 and 12 at opposite sides of the pistons therein so that the hydraulic circuits 14 and 16 are closed circuits.

Filler plugs 156 and 158 are threaded into the filler ports 46 and 54 in the control device 10. Bleeder plugs 160 and 162 are threaded into the bleeder ports 98 and 108 in the device 12. These plugs are removable to fill the circuits with hydraulic fluid and to bleed air from the circuits.

It will be understood that the two hydraulic circuits will normally be completely filled with hydraulic fluid introduced through the filler ports. Any air in the circuits should be bled away at the bleeder ports so that the slave device 12 may be operated by the control device 10 without any spongeness.

In use, the manual control device 10 will normally be mounted inside the cab of the truck or bus for convenient operation by the driver. He may angularly adjust the mirror on the outside of the vehicle by simply pushing or pulling the handle 64 to move the piston 30 in the control device 10 one way or the other. This will produce a build-up of pressure in one of the hydraulic circuits and cause a similar movement of the piston 92 in the slave device 12, producing the angular movement of the mirror through the rack and pinion connection 114,116. At the same time that hydraulic fluid is pushed from the control device 10 to the slave device 12 through one of the closed hydraulic circuits, hydraulic fluid is returned to the control device through the other circuit.

The socket 58 in the control device is sufficiently long so that the locking portion 70 of the handle is always inside the socket throughout the full range of movement of piston 30. Accordingly, in any longitudinally adjusted setting of the piston 30, it may be locked by merely turning the handle or knob 64 in either direction from the unlocked position of FIG. 3 to produce a wedging or friction locking engagement between the peripheral surface of the locking portion 70 of the knob and the wall of the socket 58. To reset the mirror, the knob is released or unlocked by simply reverse rotating it.

What I claim as my invention is:

1. Remote control actuating mechanism for adjusting the angular position of an outside vehicle rearview mirror, comprising a master control device and a slave device, said control device having a hydraulic control cylinder and a manually operable control piston reciprocable therein, said slave device having a hydraulic slave cylinder and a slave piston reciprocable therein, a first closed hydraulic circuit including a conduit filled with hydraulic fluid communicating at its ends with said cylinders at one side of the pistons therein, a second closed hydraulic circuit including a conduit filled with hydraulic fluid communicating at its ends with said cylinders at the opposite side of the pistons therein, said first and second closed hydraulic circuits being completely sealed against communication with one another in all positions of said pistons, said control piston having an external knob for manually moving said control piston in one direction or the other and thereby effecting a corresponding movement of said slave piston by hydraulic fluid pressure in one of said circuits, means for locking said control piston in any selected position of adjustment within its range of movement to thereby hydraulically lock said slave piston in adjusted position, said locking means including a smooth annular locking portion of said knob, said knob being rotatable, means on said control device defining a smooth annular chamber receiving said locking portion, said locking portion being freely received in said chamber in one position of rotation of said knob and binding on said chamber wall upon rotation of said knob from said one position thereof, and means providing a connection between said slave piston and said mirror to angularly adjust said mirror in response to such movement of said slave piston.

2. Remote control actuating mechanism for adjusting the angular position of an outside vehicle rearview mirror, comprising a master control device and a slave device, said control device having a hydraulic control cylinder and a manually operable control piston reciprocable therein, said slave device having a hydraulic slave cylinder and a slave piston reciprocable therein, a first closed hydraulic circuit including a conduit filled with hydraulic fluid communicating at its ends with said cylinders at one side of the pistons therein, a second closed hydraulic circuit including a conduit filled with hydraulic fluid communicating at its ends with said cylinders at the opposite side of the pistons therein, said first and second closed hydraulic circuits being completely sealed against communication with one another in all positions of said pistons, said control piston having an external knob for manually moving said control piston in one direction or the other and thereby effecting a corresponding movement of said slave piston by hydraulic fluid pressure in one of said circuits, means for locking said control piston in any selected position of adjustment within its range of movement to thereby hydraulically lock said slave piston in adjusted position, said locking means including a circular locking portion of said knob, said knob being rotatable on the axis of said control piston, means on said control device defining a cylindrical chamber receiving said locking portion, said locking portion being eccentric relative to said axis, said chamber being eccentric relative to said axis, said locking portion in one position of rotation of said knob being concentric with and freely received in said chamber but binding on said chamber wall with a wedging lock upon rotation of said knob in either direction from said one position thereof, and means providing a connection between said slave piston and said mirror to angularly adjust said mirror in response to such movement of said slave piston.

3. The remote control actuating mechanism defined in claim 2 having a hydraulic filler port and a hydraulic bleeder port in each hydraulic circuit, and removable plugs for closing said filler and bleeder ports.

4. The remote control actuating mechanism defined in claim 3, wherein said means providing a connection between said slave piston and said mirror includes a rack carried by said slave piston and a gear segment carried by said mirror in mesh with said rack.

* * * * *